June 22, 1926.
S. Z. HALL
1,590,174
COTTON HARVESTER
Filed April 7, 1925   2 Sheets-Sheet 1
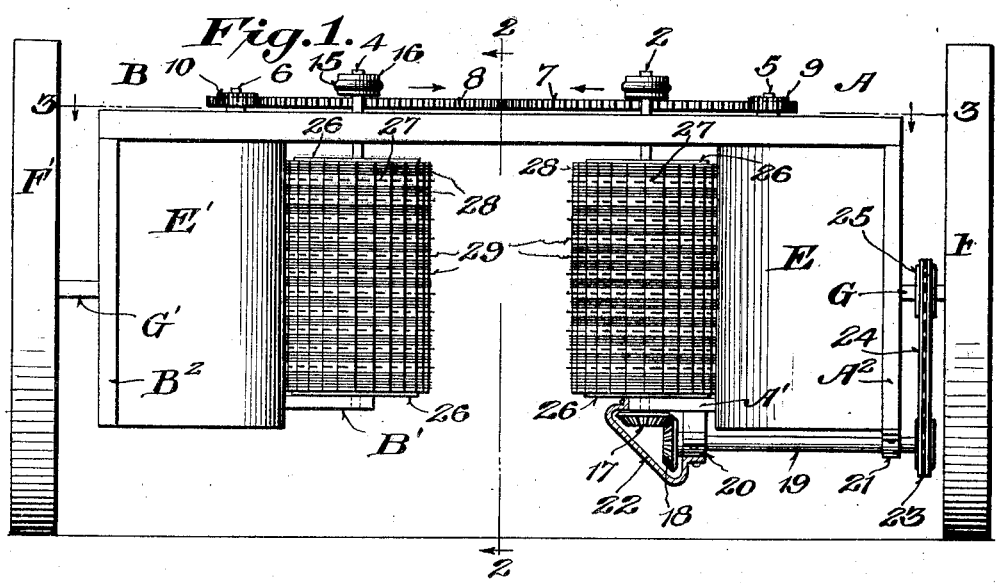
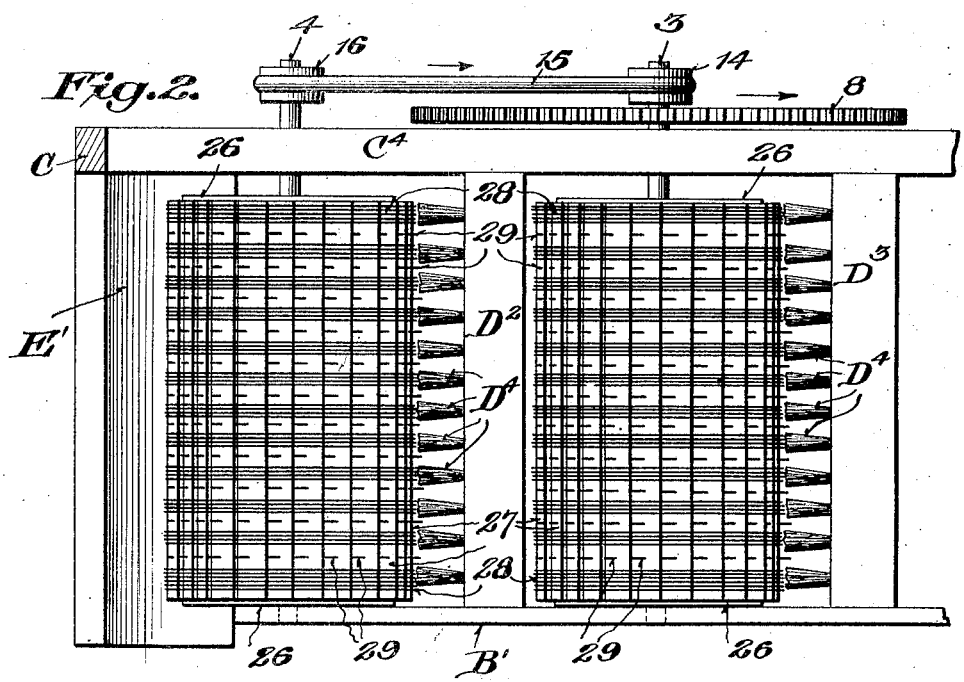
WITNESSES:
Samuel Z. Hall, deceased,
Susie B. Wheeler, Executrix.
By
Attorney

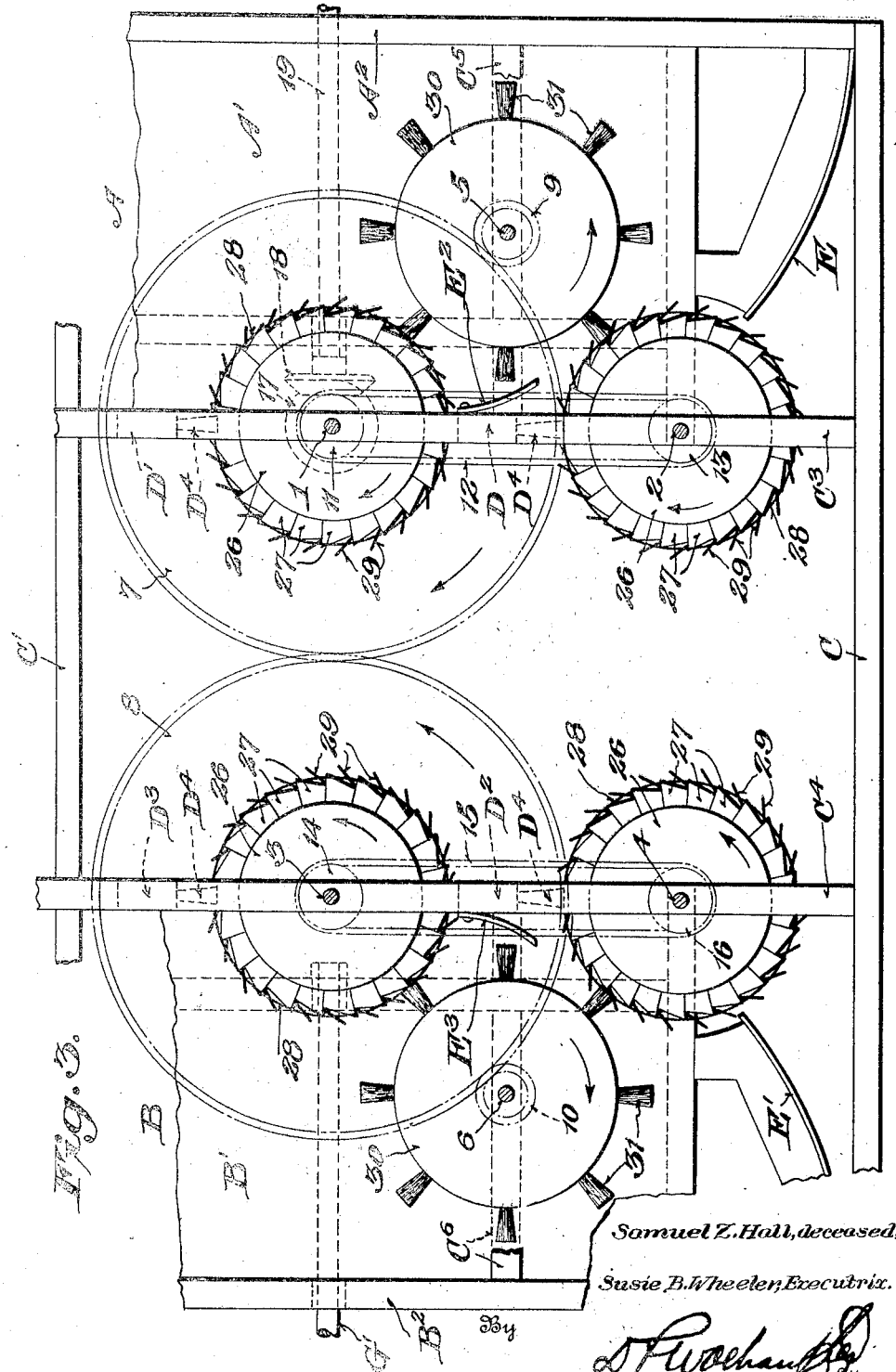

Patented June 22, 1926.

1,590,174

UNITED STATES PATENT OFFICE.

SAMUEL Z. HALL, DECEASED, LATE OF LITTLE ROCK, ARKANSAS; BY SUSIE B. WHEELER, EXECUTRIX, OF LITTLE ROCK, ARKANSAS.

COTTON HARVESTER.

Application filed April 7, 1925. Serial No. 21,408.

This invention relates to cotton harvesters, and has for one of its objects to produce a harvester in accordance with this invention which is capable of straddling the rows and picking the seed cotton from the stalks by a plurality of revolving picking cylinders driven in unison by special gearing connections with one of the master wheels of the harvester.

Another object of this invention is to provide the harvester with a stationary brush adjacent each of the picking cylinders for cleaning the seed cotton of all limbs, hulls, trash, etc. as the cotton is collected from the stalks and conveyed into the harvester by the picking cylinders.

A further object of this invention is to provide the harvester with a revolving brush for each pair of picking cylinders for stripping the previously cleaned seed cotton from the cylinders and casting the cotton into suitable receptacles or conveyors within the harvester, the revolving brushes being also driven co-ordinately with the revolving cylinders by the special gearing connections of the harvester.

A still further object of the invention resides in the provision of arcuate metal guard members at the front of the harvester in proximity to each of the front picking cylinders and also in front of each of the intermediate picking cylinders for preventing the seed cotton from being thrown outwardly of the harvester by the stripping brushes.

These and other objects will more fully appear and the nature of the invention will be more clearly understood from the detailed description in the following specification, the subject matter of the claims, and the several views in the accompanying drawings, in which:

Figure 1 is a front view of the harvester.

Figure 2 is a vertical sectional view, on line 2—2 and looking in the direction of the arrows, showing a portion of the interior construction of the harvester; and Figure 3 is a top plan view of the harvester, shown partly broken away, and more fully showing the relative positioning and the means for revolving the picking cylinders and the stripping brushes.

Referring to the drawings, wherein similar reference characters denote corresponding parts throughout the several views, the harvester comprises two spaced compartments A and B of any suitable frame work and provided with the respective bottoms A′ and B′ and the side walls $A^2$ and $B^2$. The compartments A and B are connected together in spaced relation by the upper front cross bar C and the upper rear cross bar C′. Connecting the cross bars C and C′ in substantial vertical alinement with the inner edges of the floors A′ and B′ are the longitudinal bars $C^3$ and $C^4$. Connecting the upper edge portion of the side $A^2$ with the bar $C^3$ is a transverse strut $C^5$ and likewise connecting the upper edge portion of the side $B^2$ is a similar strut $C^6$. Extending from the bar $C^3$ to the inner edge of the floor A′ are the front and rear posts D and D′, and likewise extending from the bar $C^4$ to the inner edge of the floor B′ are the front and rear posts $D^2$ and $D^3$, and upon the posts D, D′, $D^2$ and $D^3$ are arranged the stationary brushes $D^4$.

The fronts of the compartments A and B are closed by the arcuate metal guard or deflector members E and E′ and also upon the inner sides of the posts D and $D^2$ are the arcuate metal guard or deflector plates $E^2$ and $E^3$. The rear ends of the compartments A and B may be suitably closed or may be left open as desired in order that the harvested cotton may be discharged upon a cross conveyor for loading a wagon or the like. The harvester travels over the field and is supported by the master wheels F and F′ journaled on the trunnions or stub axles G and G′ suitably secured to the sides $A^2$ and $B^2$ of the harvester, as shown in Figure 1.

Suitably journaled through the bar $C^3$ and adjacent the inner edge of the bottom A′ are the vertical shafts 1 and 2, and also suitably journaled through the bar $C^4$ and adjacent the inner edge of the bottom B′ are the vertical shafts 3 and 4. There are also journaled through the bar or strut $C^5$ and in the bottom A′ the vertical shaft 5 and likewise journaled through the bar or strut $C^6$ and in the bottom B′ is another vertical shaft 6.

Secured upon the upper end of shaft 1 is a large gear wheel 7 meshing with a similar large gear wheel 8 secured to the upper end of shaft 3, the gear wheel 7 also meshing with a gear pinion 9 secured upon the upper end of shaft 5 while the large gear wheel 8 meshes with a gear pinion 10 secured upon the upper end of shaft 6. Upon shaft 1 above gear wheel 7 is a pulley or sprocket wheel 11 connected by a belt or sprocket chain 12 with a pulley or sprocket wheel 13 on shaft 2, and also upon shaft 3 above gear wheel 8 is a pulley or sprocket wheel 14 connected by a belt or sprocket chain 15 with a pulley or sprocket wheel 16 on shaft 4. However, shaft 1 projects through the bottom A′ of the harvester and has secured upon its projecting end the bevel gear 17 meshing with a bevel gear 18 on one end of the shaft 19 journaled in the bearings 20 and 21 on the underside of the bottom A′, the bevel gears 17 and 18 being protected by a casing or housing 22. Upon the outer end of shaft 19 is a sprocket wheel 23 connected by a sprocket chain 24 to a sprocket wheel 25 suitably secured upon the hub of the master wheel F shown fully in Figure 1.

Rigidly secured upon each of the vertical shafts 1, 2, 3 and 4 is a pinned or spiked picking cylinder each of which is formed of a plurality of superimposed horizontal disks 26 and secured upon the peripheries thereof and placed in close relation are the plurality of vertical slats or bars 27 which are formed substantially trapezoidal in cross section with their narrow edges abutting the broader edges consecutively throughout the circumference of the cylinders, and to further secure the slats or bars 27 upon the disks 26 there is employed a plurality of spaced superimposed bands of wire 28, (see Fig. 2) which may consist of any desired number of strands of wire. Secured in the portions of the broad edges of the slats or bars 27 which project outwardly of the contiguous narrow edges of the slats and between each row or band of wire 28 are a plurality of rows of vertically alined obliquely disposed picking pins or spikes 29. The slats or bars 27 of the cylinders on shafts 3 and 4 are placed or positioned in reverse order to the slats or bars 27 of the cylinders on shafts 1 and 2, whereby the pins or spikes 29 of the pair of cylinders at one side of the harvester are obliquely disposed in a direction opposite to that of the pins or spikes 29 of the pair of cylinders at the other side of the harvester, the purpose of such reversal being clearly understood from a careful review of Figure 3 of the drawings.

Secured upon each of the shafts 5 and 6 is a cotton stripping brush, one for each pair of picking cylinders at each side of the harvester, each stripping brush consists preferably of a cylindrical block 30 of suitable material and having upon the periphery thereof a plurality of superimposed rows of brushes 31 shown in Figure 3.

In operation, the harvester is drawn over the field by horse power or any other suitable power with the rows of cotton plants passing centrally through the harvester and between the opposing rows of picking cylinders. This movement of the harvester causes master wheel F to revolve and by means of the sprocket wheel 25, sprocket chain 24 and sprocket 23 the shaft 19 and its bevel gear 18 will also be revolved. The revolution of the bevel gear 18 will revolve bevel gear 17 on the lower end of shaft 1 and through the medium of the intermeshing gear wheels 7 and 8 and the gear pinions 9 and 10, together with the sprocket and chain connections 11, 12 and 13, and 14, 15 and 16, the vertical shafts 1, 2, 3, 4, 5 and 6 together with the respective picking cylinders and stripping brushes thereon, will be revolved simultaneously in the directions indicated by the respective arrows as illustrated in Fig. 3 of the drawings. Whereby, the seed cotton will be efficiently picked from the plants by the pins 29 of the picking cylinders as the plants pass therebetween and carried against the stationary brushes D⁴ whereat the seed cotton will be effectually cleaned of all limbs, trash, leaves, etc. The cleaned cotton will thereafter be carried into the respective compartments A and B of the harvester by the pins 29 of the picking cylinders wherein the cylinders will come in contact with the rapidly revolving stripping brushes 31, there being a stripping brush for each pair of picking cylinders, whereby the seed cotton will be stripped from the pins 29 and thrown into the respective compartments A and B, the guard members E and E′ at the front of the harvester and the intermediate guard members E² and E³ directing the cotton into the compartments and preventing the cotton from being thrown outwardly of the harvester by the stripping brushes.

Each of the compartments A and B may be supplied with any suitable form of rearwardly traveling conveyor if desired and the idle supporting wheel F′ may be suitably geared to the working parts of the harvester in a similar manner to that in which the master wheel F is operatively connected.

The harvester may be constructed of any desired width and length and any number of longitudinally alined picking cylinders and coacting stripping brushes of any suitable dimensions may be employed, and I may, therefore, resort to numerous alterations and variations therein from time to time as I may deem expedient without departing from the spirit of the invention or the scope of the claims.

I claim:

1. In a cotton harvester, a supporting structure having translating wheels, picking cylinders mounted in said structure for collecting cotton from the plants, cleaning brushes arranged adjacent said cylinders for removing foreign matter from the cotton, a stripping brush mounted to cooperate with a plurality of picking cylinders to remove the cotton therefrom, and means connecting one of said translating wheels with said picking cylinders and stripping brush.

2. In a cotton harvester, a wheeled supporting structure having motion transmitting wheels, a plurality of picking cylinders mounted thereon, such cylinders being mounted in pairs in laterally spaced relation, a stripping brush for each pair of picking cylinders, stationary cleaning brushes arranged in proximity to said picking cylinders for removing foreign matter from the cotton, and means connected with one of said motion transmitting wheels for operating said picking cylinders and stripping brushes.

3. In a harvester of the class described, the combination with spaced compartments to adapt cotton plants to pass therebetween, translating wheels for supporting said compartments, a plurality of picking cylinders associated with the inner sides of said compartments for collecting cotton from said plants, of stationary brushes in proximity to said picking cylinders for cleaning the cotton of foreign matter, stripping brushes within said compartments for removing the cotton from said picking cylinders, shafts for said picking cylinders and said stripping brushes, and means for operatively connecting said shafts with one of said translating wheels for revolving said shafts, said picking cylinders and said stripping brushes.

4. In a harvester of the class described, the combination with spaced compartments, translating wheels for supporting said compartments, of a plurality of picking cylinders associated with said compartments, stripping brushes within said compartments for acting upon said picking cylinders, means for operatively connecting one of said translating wheels with said picking cylinders and said stripping brushes for revolving the latter, and guard members at the front of said compartments for preventing the cotton from one of said picking cylinders from being thrown outwardly thereof by said stripping brushes.

5. In a harvester of the class described, the combination with spaced compartments, translating wheels for supporting said compartments, of a plurality of picking cylinders associated with said compartments, stripping brushes within said compartments for acting upon said picking cylinders, means for operatively connecting one of said translating wheels with said picking cylinders and said stripping brushes for revolving the latter, and front and intermediate guard members for said compartments for preventing the cotton from the picking cylinders being thrown outwardly of said compartments by said stripping brushes.

In testimony whereof I hereunto affix my signature.

SUSIE B. WHEELER,
*Executrix of Samuel Z. Hall, Deceased.*